W. R. MITCHELL.
WATER CLOSET.
APPLICATION FILED JUNE 27, 1913.
1,107,094.
Patented Aug. 11, 1914.
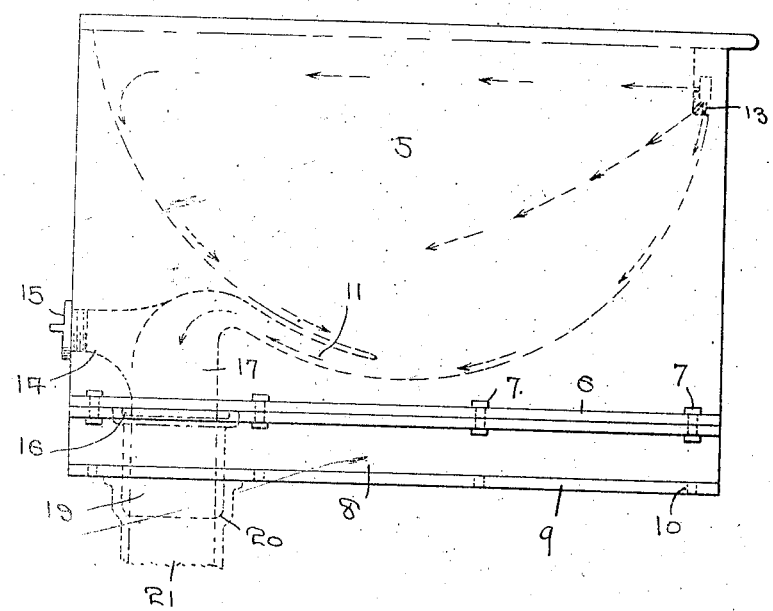
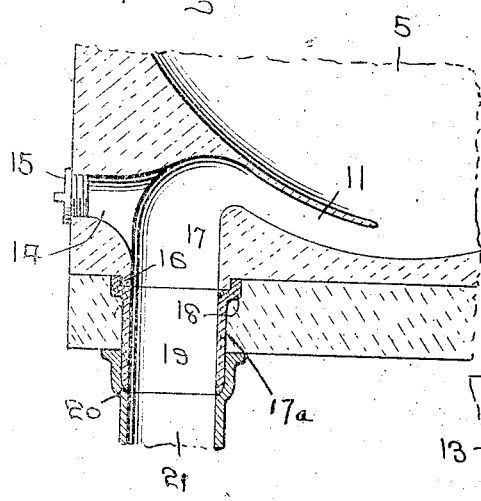
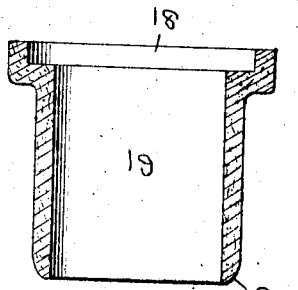
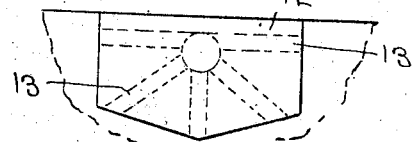
Witnesses
Inventor
Wm. R. Mitchell
By W. J. FitzGerald
Attorney

UNITED STATES PATENT OFFICE.

WILLIAM R. MITCHELL, OF DETROIT, MICHIGAN.

WATER-CLOSET.

1,107,094.	Specification of Letters Patent.	Patented Aug. 11, 1914.

Application filed June 27, 1913. Serial No. 776,039.

*To all whom it may concern:*

Be it known that I, WILLIAM R. MITCHELL, a citizen of the United States, residing at Detroit, in the county of Wayne and State of Michigan, have invented certain new and useful Improvements in Water-Closets; and I do hereby declare the following to be a full, clear, and exact description of the invention, such as will enable others skilled in the art to which it appertains to make and use the same.

This invention relates to water closets, and has for its object to provide a device of this character of simple and sanitary construction.

Another object is the provision of an improved closet bowl and base and joint therebetween adapted for connection with a soil pipe.

In the accompanying drawing wherein is illustrated a preferred embodiment of my invention, Figure 1 represents a side elevation of the improved water closet, showing the interior construction in dotted lines. Fig. 2 represents a detailed sectional view of the trap portion. Fig. 3 represents a sectional view through the coupling sleeve, and, Fig. 4 represents a fragmental detail view of the water distributing plug.

Referring to the drawing wherein similar reference numerals designate corresponding parts throughout the several views, 5 indicates the bowl which may be constructed in any preferred shape and of any desired material, and is provided with oppositely extending flanges 6 at its lower edge which are secured by means of bolts 7 to the base member 8. The outwardly directed flanges 9 of the base 8 are adapted to be secured to the floor, and for this purpose suitable apertures 10 are formed therein.

The under face of the bowl 5 is formed with an annular flange 16 surrounding the outlet opening 17 therein for the water. The base 8 is formed with an outlet opening 17ª registering with the opening 17 of the bowl and having its upper end enlarged. A coupling sleeve 19 is arranged within the opening 17ª and is formed with a flared end 18 received within the enlarged upper end of the opening 17ª. When the bowl 5 and base 8 are secured together by the bolts 7 the flange 16 engages the inner face of the flared end 18 securing the latter within the enlarged end of the opening 17ª. The coupling sleeve 19 is preferably formed of soft or malleable metal, thereby insuring a water or gas tight joint between the base and bowl. The sleeve 19 projects below the base 8 and is adapted to be connected with a suitable soil or sewer pipe 21, as indicated at 20 in Fig. 2.

It will be understood that the bowl 5 is provided with the usual water trap 11 and distributing plug 12 formed with suitable openings 13 adapted to admit water to the bowl as the latter is flushed. An opening 14 is preferably formed in the wall of the trap 11 for permitting suitable instruments to be inserted therethrough for clearing away obstructions. The opening 14 is normally closed by a suitable plug 15 to prevent leakage.

What I claim is:—

In combination, a base having an outlet opening enlarged at its upper end, top and bottom flanges on said base, a bowl having an outlet opening, flanges at the bottom of said bowl resting upon the top flanges of the base, an annular flange surrounding the bowl opening, a soft metal sleeve having a flared end to be retained in the enlarged end of said base opening by said annular flange, said soft metal sleeve adapted to extend beyond the base for attachment to a soil pipe and means to secure the adjacent flanges of the bowl and base.

In testimony whereof I have signed my name to this specification in the presence of two subscribing witnesses.

WILLIAM R. MITCHELL.

Witnesses:
FRANCES E. HERBERT,
CLIFFORD A. BRITT.